(12) United States Patent  
Ramirez et al.

(10) Patent No.: US 7,770,533 B2  
(45) Date of Patent: Aug. 10, 2010

(54) BIRD FLIGHT DIVERSION DEVICE AND SYSTEM FOR FIXING SAME TO OVERHEAD WIRES AND CABLES

(75) Inventors: Mauricio Ramirez, Medellin (CO); Alberto Naranjo, Medellin (CO); Maria del Pilar Noriega, Medellin (CO); Miguel Luna, Medellin (CO); Luis Cadena, Medellin (CO); Apolinar Alzate, Medellin (CO)

(73) Assignee: Interconexion Electricia S.A., Medellin (CO)

( * ) Notice: Subject to any disclaimer, the term of this patent is extended or adjusted under 35 U.S.C. 154(b) by 85 days.

(21) Appl. No.: 12/065,870

(22) PCT Filed: Sep. 5, 2006

(86) PCT No.: PCT/IB2006/003372

§ 371 (c)(1),  
(2), (4) Date: Aug. 28, 2008

(87) PCT Pub. No.: WO2007/029118

PCT Pub. Date: Mar. 15, 2007

(65) Prior Publication Data

US 2009/0016689 A1    Jan. 15, 2009

(30) Foreign Application Priority Data

Sep. 5, 2005    (CO) .................................. 05-088703

(51) Int. Cl.  
*A01M 29/00*    (2006.01)  
*H02G 7/00*    (2006.01)

(52) U.S. Cl. ............................... 116/209; 116/DIG. 33; 248/317

(58) Field of Classification Search ................. 116/209, 116/22 A, DIG. 33; 40/617; 248/61, 617, 248/323, 342; D10/109  
See application file for complete search history.

(56) References Cited

U.S. PATENT DOCUMENTS

| 543,329 A | 7/1895 | Breakspear |
| 1,635,915 A * | 7/1927 | White .......................... 116/30 |
| 2,085,077 A | 6/1937 | Fox et al. |

(Continued)

FOREIGN PATENT DOCUMENTS

CA    366437    6/1937

(Continued)

*Primary Examiner*—R. A. Smith  
(74) *Attorney, Agent, or Firm*—Merchant & Gould P.C.

(57) ABSTRACT

The invention relates to a device for diverting the flight of birds in order to prevent collisions with overhead wires and cables, such as high-voltage lines. The inventive device comprises a system for fixing same to overhead wires and cables, from which a central body is suspended. The fixing system enables the device to be mounted to or removed from overhead wires and cables of different diameters manually by one person. The diversion device comprises a modular construction, thereby facilitating the transport thereof and the replacement of any part if necessary. Once assembled, the volume of the device is greater than that of the individual parts. All of the device is made form an electrically-insulating polymer material which does not corrode the cables or wires. Moreover, the device can move and the components thereof can have different colors in order to render same more visible. In addition, the components of the device are perforated such as to have low wind resistance.

8 Claims, 9 Drawing Sheets

U.S. PATENT DOCUMENTS

| | | | | |
|---|---|---|---|---|
| 2,547,225 | A * | 4/1951 | Mebold | 403/396 |
| 3,135,236 | A * | 6/1964 | Pfeiffer | 116/209 |
| 3,298,072 | A * | 1/1967 | Whalen | 403/326 |
| 3,431,576 | A * | 3/1969 | Dalhart et al. | 15/229.1 |
| 4,562,982 | A * | 1/1986 | McSherry et al. | 248/61 |
| 4,646,997 | A * | 3/1987 | Fadley | 248/201 |
| 4,862,637 | A * | 9/1989 | Dressel | 43/98 |
| 4,885,835 | A | 12/1989 | Osgood | |
| 5,058,335 | A | 10/1991 | Richter | |
| 5,208,577 | A | 5/1993 | Herzberg | |
| 5,224,440 | A | 7/1993 | Cox | |
| 5,372,335 | A | 12/1994 | Yenzer et al. | |
| 5,425,328 | A | 6/1995 | Larumbe | |
| 5,649,394 | A | 7/1997 | Ohba | |
| 5,957,416 | A * | 9/1999 | Sellati | 248/61 |
| RE36,333 | E * | 10/1999 | Kovaletz | 116/209 |
| 5,964,180 | A | 10/1999 | De Gabriele et al. | |
| 6,618,910 | B1 | 9/2003 | Pontaoe | |
| 7,316,380 | B2 * | 1/2008 | Arakawa | 248/317 |
| 2002/0069814 | A1 | 6/2002 | Hawk | |
| 2004/0255837 | A1 | 12/2004 | Donoho | |
| 2007/0137883 | A1* | 6/2007 | Naidoo | 174/138 F |

FOREIGN PATENT DOCUMENTS

| | | |
|---|---|---|
| EP | 0 031 855 | 7/1981 |
| EP | 0 823 210 | 2/1998 |
| ES | 2 128 464 | 5/1999 |
| ES | 1 060 811 | 11/2005 |
| GB | 12577 | 5/1912 |
| GB | 398967 | 9/1933 |
| GB | 2 124 065 | 2/1984 |
| JP | 03089808 A * | 4/1991 |
| JP | 06121436 A * | 4/1994 |
| JP | 09200932 A * | 7/1997 |
| JP | 9-247829 | 9/1997 |
| JP | 11-191917 | 7/1999 |
| JP | 2002-176901 | 6/2002 |
| JP | 2006166887 A * | 6/2006 |
| JP | 2008271676 A * | 11/2008 |
| WO | WO 2005/062437 | 7/2005 |

* cited by examiner

BIRD FLIGHT DIVERSION DEVICE AND SYSTEM FOR FIXING SAME TO OVERHEAD WIRES AND CABLES

TECHNOLOGICAL FIELD

The invention relates to a device for diverting the flight of birds and preventing collisions with overhead wires and cables by visual highlighting. The inventive device comprises a system for fixing same to overhead wires and cables, from which a central body is suspended, both being totally manufactured in polymeric material.

The central body consists of two components with perforations for reducing the wind resistance, which may be manufactured in different colors for generating contrast with the landscape and the vegetation at different hours of the day in the area where the wires or cables are located. The bodies are assembled with one another in a crossed way by wedge pressure, generating a volume larger than the components, volume independently.

With the bird flight diversion device, it is intended to mitigate the environmental problem of bird mortality in areas with overhead wires and cables, such as high-voltage lines.

STATE OF THE ART

In the overhead wires and cables, such as high-voltage lines, some devices are placed which help to increase the visibility of same, and to divert bird flight preventing its collision and mitigating the environmental problem of bird mortality in high concentration areas of the same, or in corridors for migratory birds. Normally, these devices are commercially known as flight diverters.

The placement of these devices on the high-voltage lines comes from beginnings of the century. Actually, many of this type of apparatus are mentioned in the state of the art. So, the U.S. Pat. No. 2,085,077 reports the placement of isolation discs for preventing the contact between high-voltage cables. Although this document is not referring to the bird flight diversion, the device highlights the presence of the cable preventing the birds' collision against the same.

Within the devices that have been manufactured for attracting the bird attention around the overhead wires or cables, such as power transmission lines, are found those for simulating birds of prey, such the devices specified in documents CA 2366437, EP 0823210, EP 0031855, GB 2124065. The disadvantage of these mechanisms is that in most of the cases, a motor for movement of the bird of prey silhouette is required or they need additional cables for its placement, which makes them more expensive and maintenance dependents.

Another raised option for the same purpose refers to spherical markers for highlighting high-voltage lines, which are widely used in aircraft circulation areas. These kind of large size spheres are placed on the cables; such as it is specified in patents U.S. Pat. No. 4,885,835, 5,964,180, 5,372,335, 5,224,440. Even some devices generate night lighting, as reported in U.S. application 2002/0069814 and U.S. Pat. No. 5,208,577. Unfortunately, the use of these spheres presents some difficulties because they are static, have a large size, are difficult to install, are expensive and some of them have metallic components that can promote the overhead wires and cables corrosion.

Another device associated to this technologic field is the device divulged in U.S. Pat. No. 5,425,328 defining a flight diverter comprised by two polymeric slats which movement facilitates visualization by the birds. However, the fixation system to the overhead cable or wire has metallic components promoting corrosion and reducing the lifetime of the cable.

The movement concept was also divulged in patent application US 2004/0255837reporting a fixation system and a hanging flat body. The problem detected with the use of this type of devices is that they are not visible to birds located in certain positions.

In addition to the devices already described, patents U.S. pat. No. 5,280,765, JP 11191917, U.S. Pat. No. 5,058,335 evidence the existence of another devices in the state of the art, which function is to protect the cable, preventing birds to position on such cables. None of these mechanisms takes into account characteristics reducing or preventing the collision of birds against the cables.

Finally, completing the information previous to the development of the invention, color spirals for wrapping cables and highlighting its presence are found, such as described in patent application JP 9247829.

From the above information it is evident that exists in the state of the art the need of having bird flight deviators having enough mobility for attracting the attention of birds, and that are manufactured in materials that do not promote the cable corrosion and easy to install.

The present invention is directed to devices having these characteristics and further showing a disposal of two crossed bodies generating a larger volume than the system composed by a unique plate facilitating birds to see the device from any location.

SUMMARY OF THE INVENTION

The present invention relates to a device for deviating the bird flight preventing, by visual highlighting, its collision against overhead cables or wires.

The device comprises a fixation system to overhead cables or wires from which a central body is suspended, both being totally manufactured in polymeric material, with an elasticity module of around 1000 MPa and with additives ensuring its stability for over 10 years, with no photo or thermo-oxidative degradation. Said materials are electrically-insulating and do not promote the corrosion of the overhead cables or wires.

The flight deviator device is light, non-expensive, has some perforations for minimizing the wind resistance and for preventing the significant vibrations in the overhead cables or wires. Moreover, it is easy to install and has enough mobility to attract the attention of the birds in order to prevent its collision against the overhead cables or wires. Another highlight of the invention is that the fixation system is characterized by not declining considerably the tighten force on the overhead cable or wire in time. Finally, the design of the invention has the advantage of being modular, which allows changing totally or partially if any of its elements fail.

DETAILED DESCRIPTION OF THE INVENTION

In general, the collision of birds against overhead cables or wires is produced in part to the low visibility that those birds have of cables or wires due to its size, landscape conditions and the vegetation at different hours of the day. According to specialized studies in this subject /1/, accidents increase as the overhead cables or wires are less visible, for instance in conditions of fog, rain or for variations in light intensity at sunrise and sunset. The potentially critic places include areas with proximity to lakes, rivers and wetlands, coast areas and migratory corridors.

The present invention proposes increasing the visibility of the overhead cables or wires by the placement of flight deviators facilitating the birds to determine the location thereof and to divert its flight in order to prevent the collision.

The flight deviator device of the present application shows a central body comprising two components which assembly between each other in a crossed way occupying a volume larger than the same independently. Both components may have different colors for generating contrast with the landscape and vegetation at different hours of the day in the area where cables or wires are located. The components are perforated for reducing the wind resistance and are suspended from the fixation system by simple support, which allows improved mobility for attracting the attention of birds during the flight.

The fixation system is comprised by three elements assembled between each other by threads or pressure wedge, insuring a fixed position in time on the overhead cable or wire.

The central body and the fixation system of the flight deviator device do not have retention surfaces that may allow the system to get dirty or to accumulate water and therefore, to promote the overhead cables or wires corrosion.

The flight deviator device was tested in a wind tunnel achieving handling winds up to 100 Km/h, without suffering any deterioration or problems in its operation.

Figure 1:
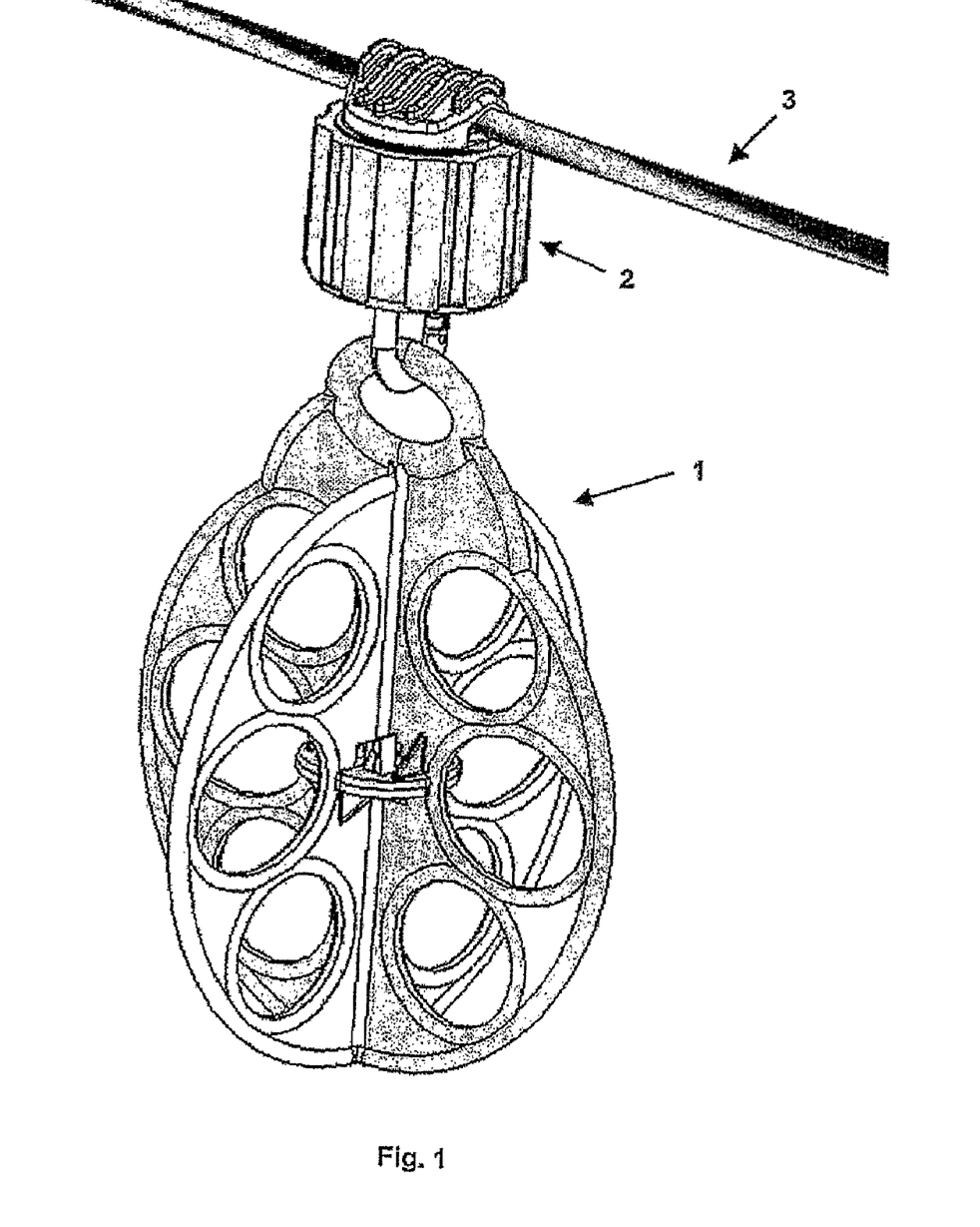
FIG. 1. Shows a flight deviator device comprised by a fixation system and a central body.
Figure 2:
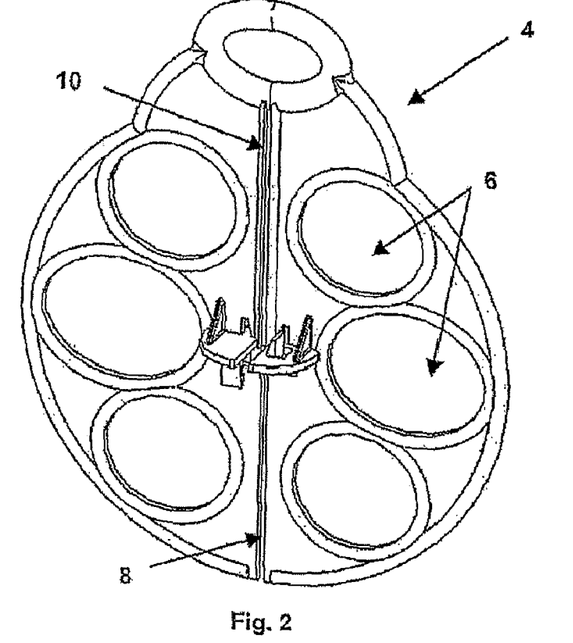
FIG. 2. Shows the first component of the central body of the flight deviator which is assembled with the fixation system.
Figure 3:
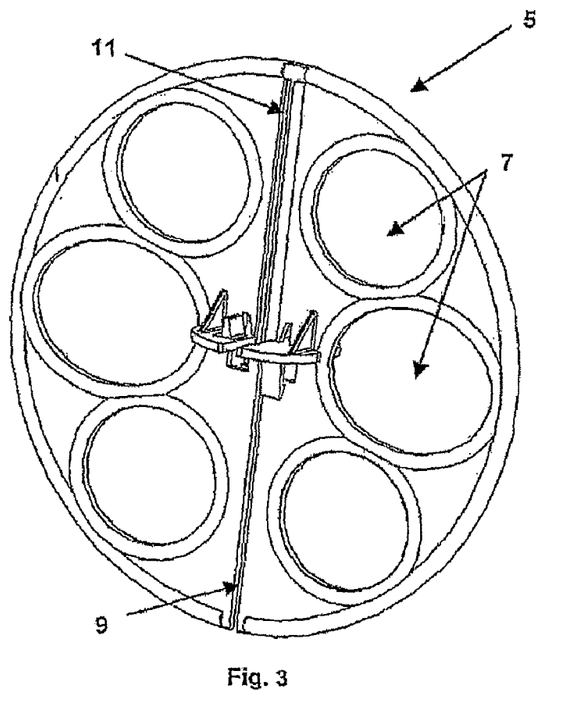
FIG. 3. Shows the second component of the central body of the flight deviator which is assembled with the component of FIG. 2.
Figure 4:
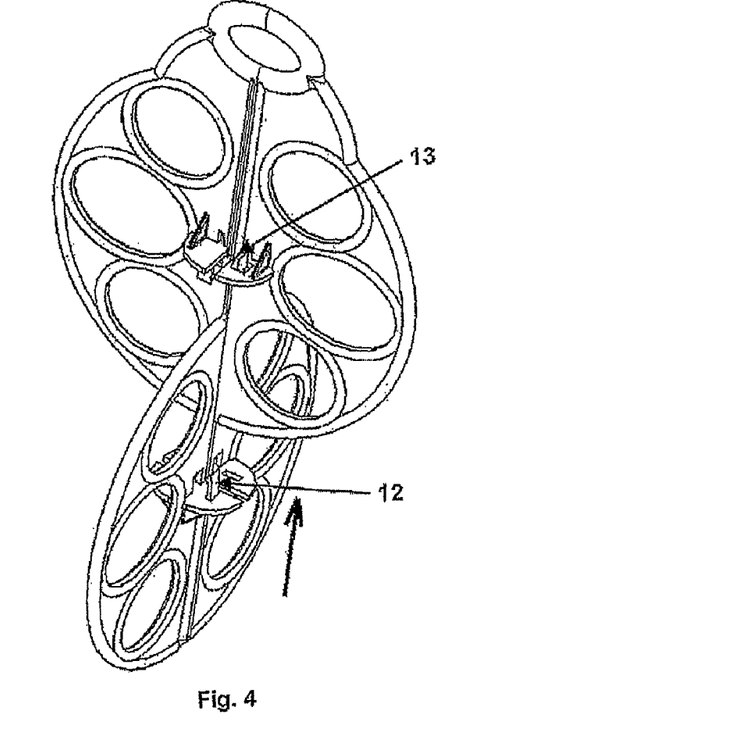
FIG. 4. Shows how the assembly of the two crossed components of the central body of the flight deviator is made, by the sliding between them.
Figure 5:
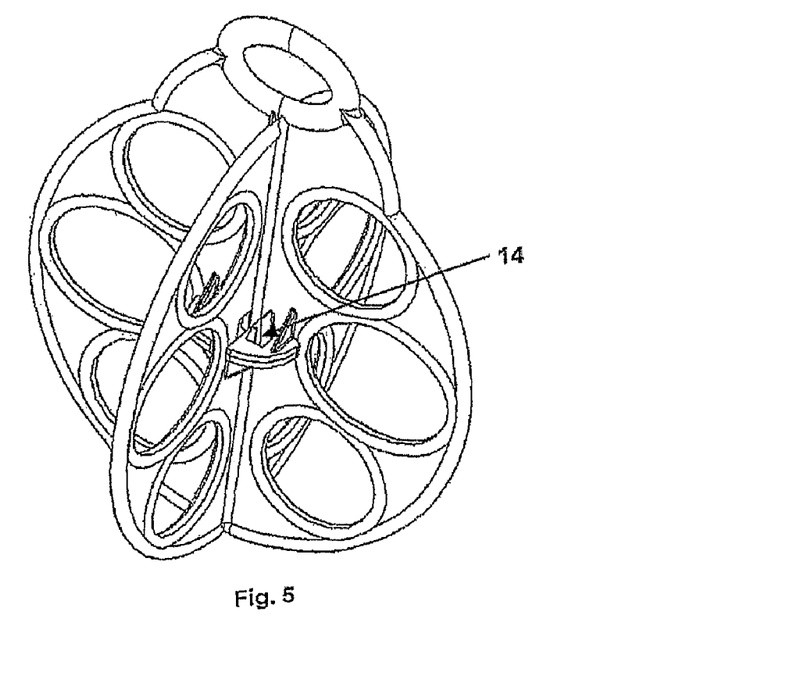
FIG. 5. Shows the assembly of the central body's two components and the pressure latching system.

To further clarify the invention, it is described in detail the flight deviator device and the fixation system using the drawings above mentioned, as follows:

FIG. 1 shows the central body (1) and the fixation system (2) fixed to the overhead cable or wire (3). As shown in FIGS. 2 and 3, the central body comprises two components (4) and (5), with holes (6) and (7) for reducing the wind resistance. These figures also show the slots (8) and (9), and guides (10) and (11), which have been designed for facilitating the slipping and assembly of the central body components in a crossed way, such as shown in FIG. 4. In this last figure, it can be seen one of the four ratchets (12) and one of the four bases (13) for making the pressure wedge (14), maintaining the two central body components of the flight deviator device bonded, as shown in FIG. 5.

In a preferred embodiment, components 4 and 5 of the flight deviator central body may have different colors for generating contrast with the landscape and vegetation at different hours of the day, in the area where the cables or wires are located. Similarly, it is important to highlight that as the components are assembled in a crossed way; they occupy a volume larger than the volume components independently, facilitating the vision of the flight deviator from any angle.

Figure 6:
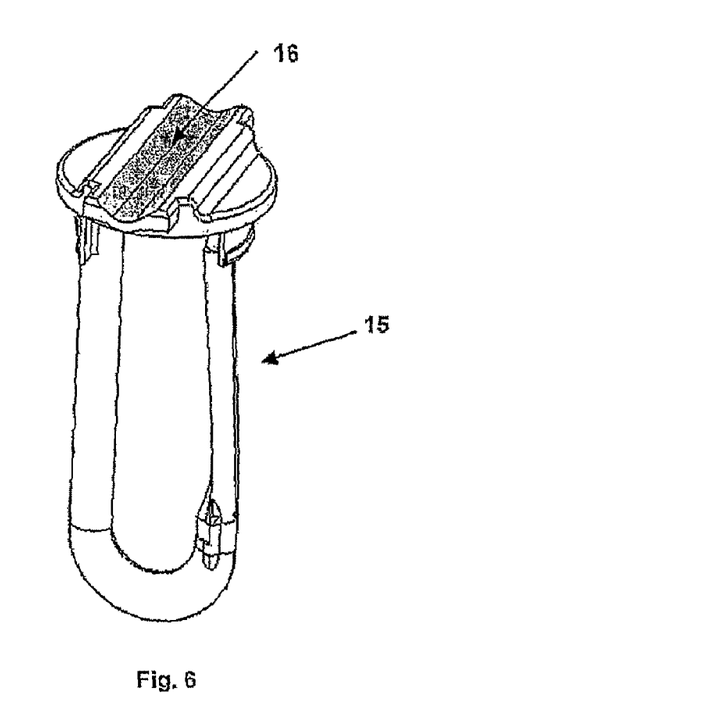
FIG. 6. Shows the hook shape element of the fixation system in closed position.

Following the description of the deviator, FIG. 6 shows the first element (15) of the fixation system, characterized by having a hook shape. This figure represents the hook in closed position. Similarly, it can be seen in the upper part of the element (15) a channel with V-shaped section (16) for the fixation of overhead cables or wires with different diameter.

Figure 7:
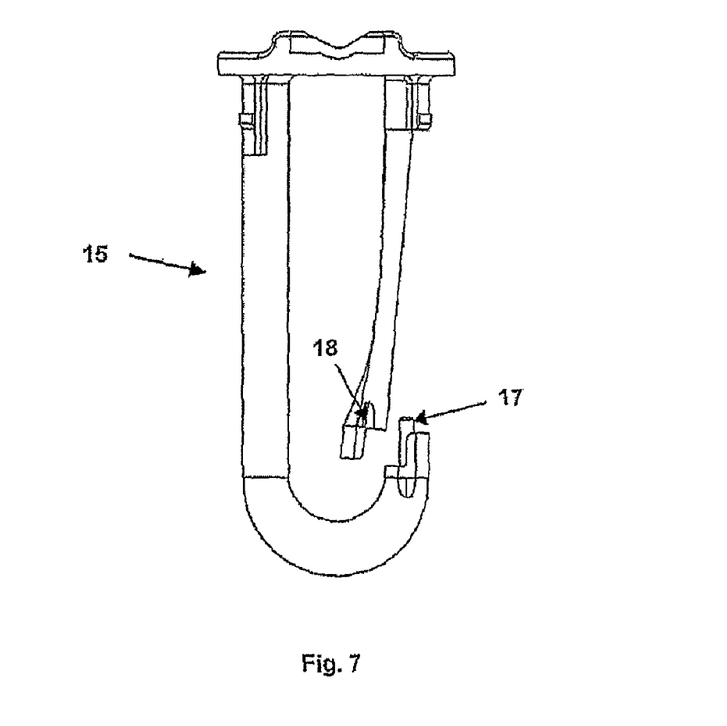
FIG. 7. Shows the hook shape element of the fixation system in open position.

The representation of the first element (15) in open position is shown in FIG. 7. Said position allows the mounting of the central body of the flight deviator shown in FIG. 5. Furthermore, it can be seen in this last figure the element (15) bonding area composed by a central protuberance (17) and a cavity (18) wherein such protuberance is hosted for preventing the easy opening of the hook in the maximum operation load levels.

Figure 8:
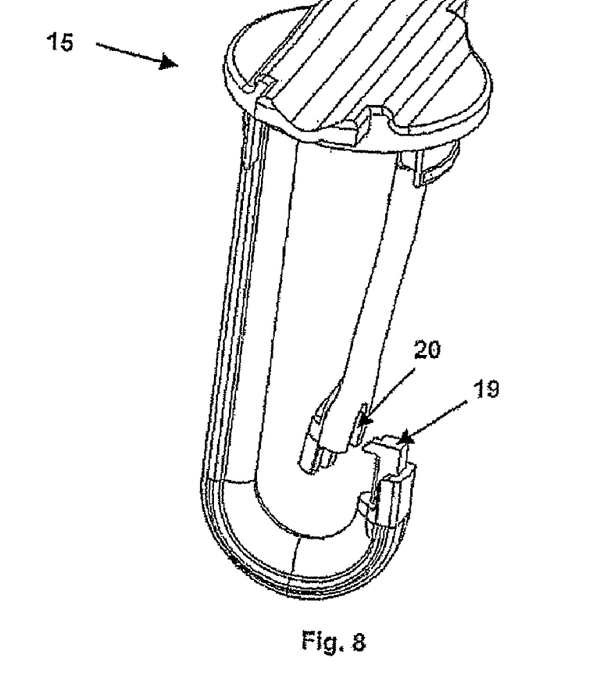
FIG. 8. Shows a variant in the hook fixation system limiting the displacement in the three coordinate axes.

An alternative of the element (15) is shown in FIG. 8, wherein a protuberance (19) and a housing (20) are exhibited, and for restricting the displacement in the three coordinated axes X, Y and Z, once the hook is closed. Therefore, the hook in the assembly area has two possible geometries for its manufacture.

Figure 9:
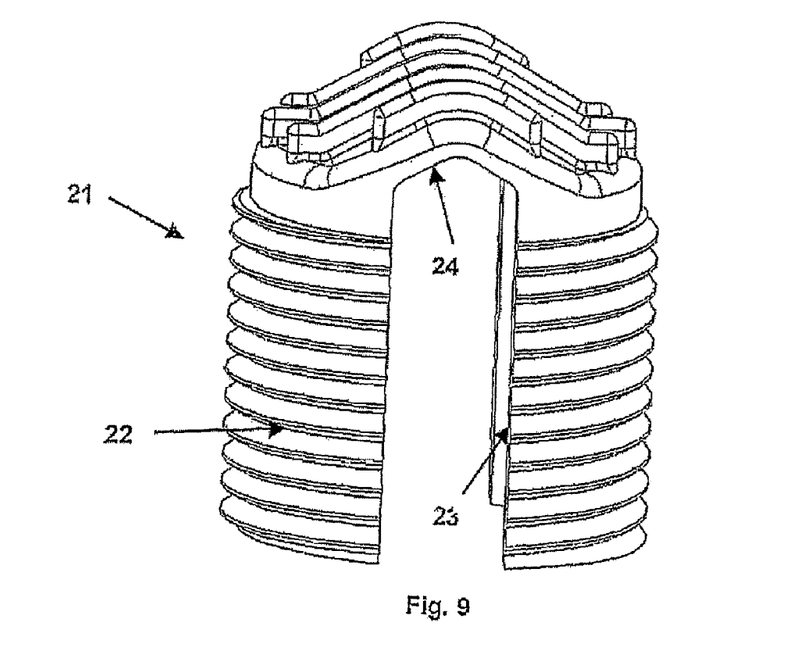
FIG. 9. Shows the fixation system element characterized by having an external thread and longitudinal slot which provide its U shape allowing the mounting on different diameter cables or wires.

A second element (21) of the fixation system characterized by an external thread (22) and a longitudinal slot (23), U-shaped, is exposed in FIG. 9. Similarly, this figure evidences the existence of a channel with V-shaped section (16) in the upper part of the element (21) allowing the mounting on overhead cables or wires with different diameter.

Figure 10A:
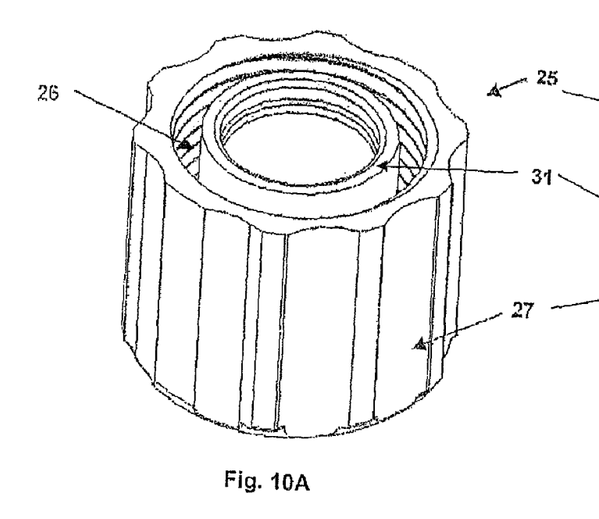
FIGS. 10A and 10B. Shows a top and bottom view of the fixation system element comprising longitudinal grooves for facilitating gripping during the assembly or disassembly and an internal thread for assembling with the element of FIG. 9.
Figure 10B:
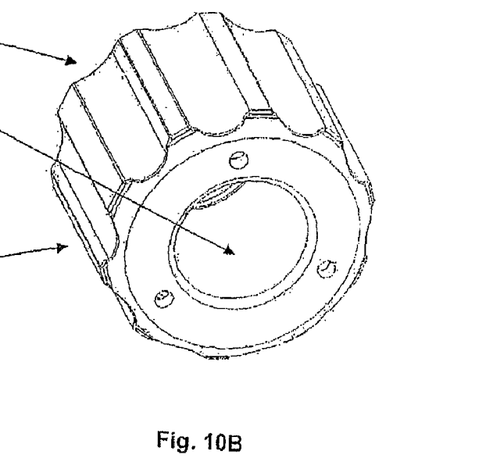

The third element (25) of the fixation system is represented in FIGS. 10A and 10B and is characterized by an internal thread (26) assembling with the external thread (22) of the element (21). It also has a bush-shaped internal part (31) through which the first element (15) is introduced and is permanently supported. In addition, FIGS. 10A and 10B show how the third element (25) has longitudinal grooves (27) for facilitating the manual grip during the assembly or disassembly. Another characteristic of this element is that in the lower part of the space comprised between the internal thread (26) and the bush-shaped internal part (31) includes perforation for preventing it to get dirty.

Figure 11:
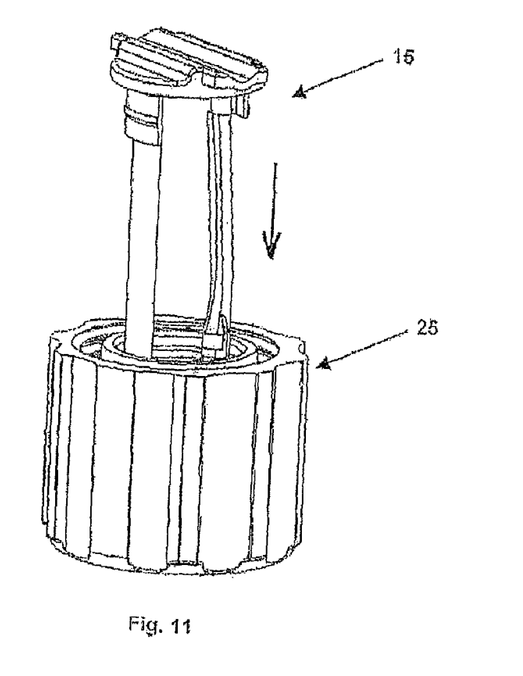
FIG. 11. Shows the positioning between the hook and the element characterized by an internal thread.
Figure 12:
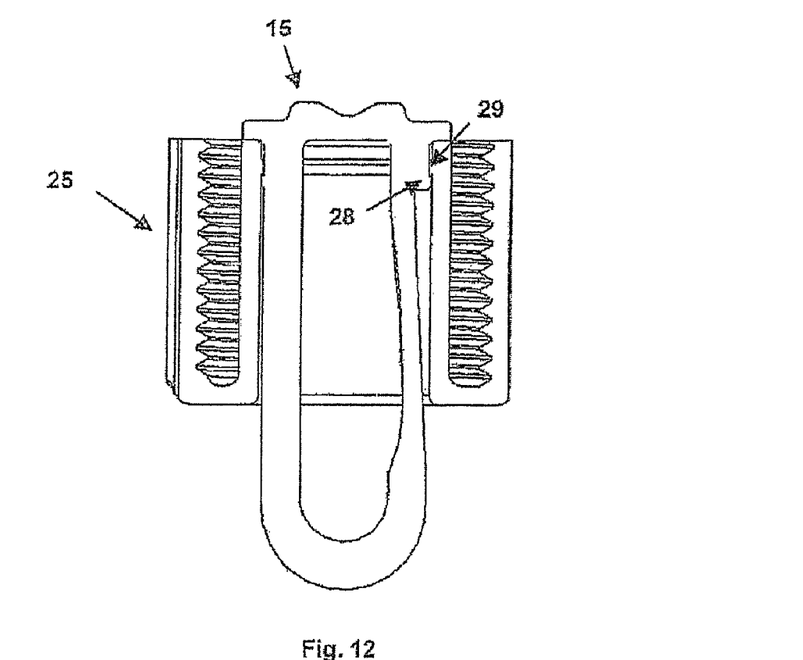
FIG. 12. Shows a view of the hook and the element characterized by an internal thread assembled.
Figure 13:
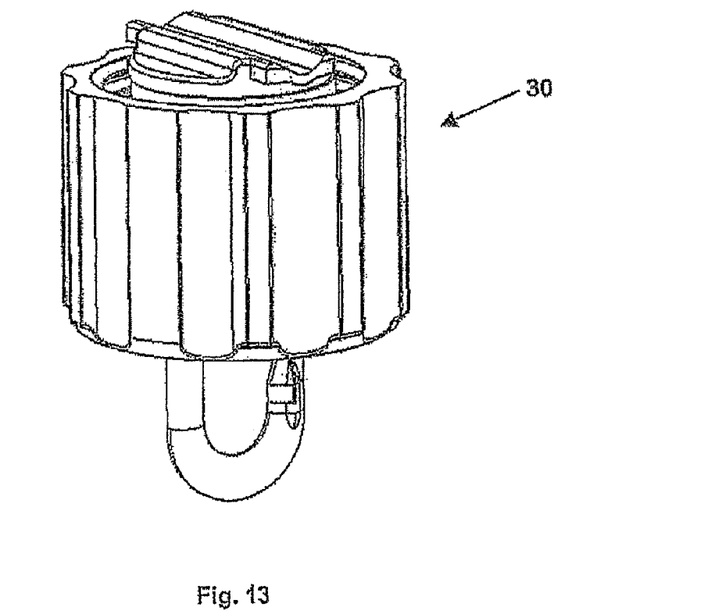
FIG. 13. Shows the hook and the element characterized by an internal thread assembled.

The bonding of the first element (15) and the third element (25) is shown in FIGS. 11 and 12 representing the way it is introduced by the axis slipping, the first element (15) in the third element (25), until a pressure adjustment between fasteners (28) and (29) of the first element (15) and the third element (25) respectively is made. FIG. 13 shoes the set (30) resultant of the assembly of the first element (15) and third element (25).

Figure 14:
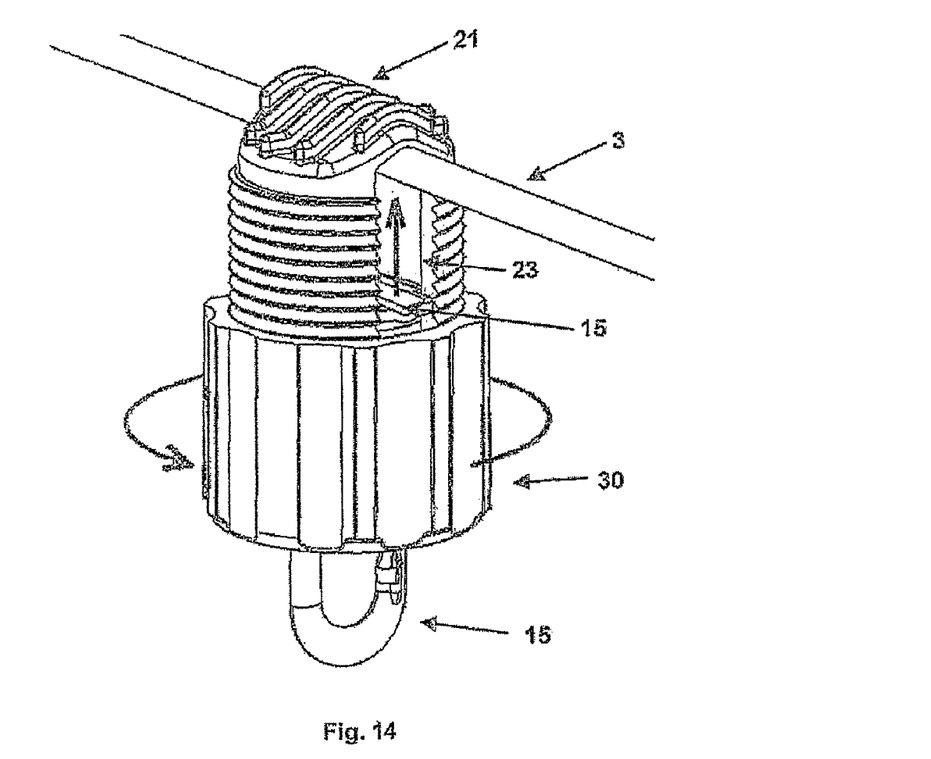
FIG. 14. Shows the mounting of the fixation system to overhead cables or wires.
Figure 15:
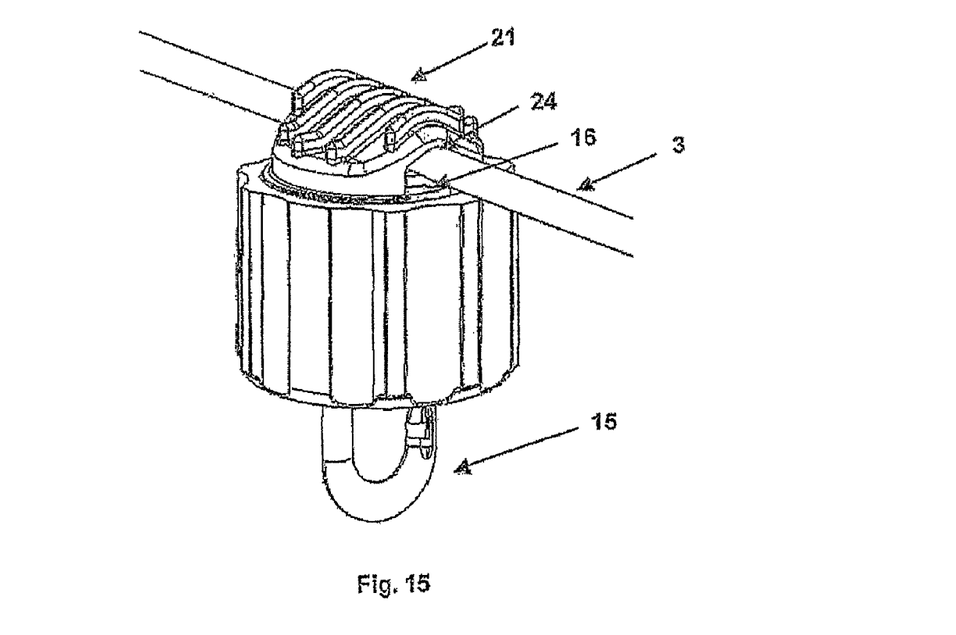
FIG. 15. Shows the fixation system fixed to the overhead cable or wire.

For the fixation system assembly (2) it is placed the second element (21) on the overhead cable or wire (3) as indicated in FIG. 14. Subsequently, by the thread the set (30) is introduced on the second element (21). As the set (30) is threaded on the element (21) an axis displacement is produced wherein the first element (15) is lineally displaced on the slot (23) of the second element (21), until the overhead cable or wire (3) is fixed by the channel with V-shaped section (16) of the first element (15) against the channel with V-shaped section (24) of the second element (21), as shown in FIG. 15.

Figure 16:
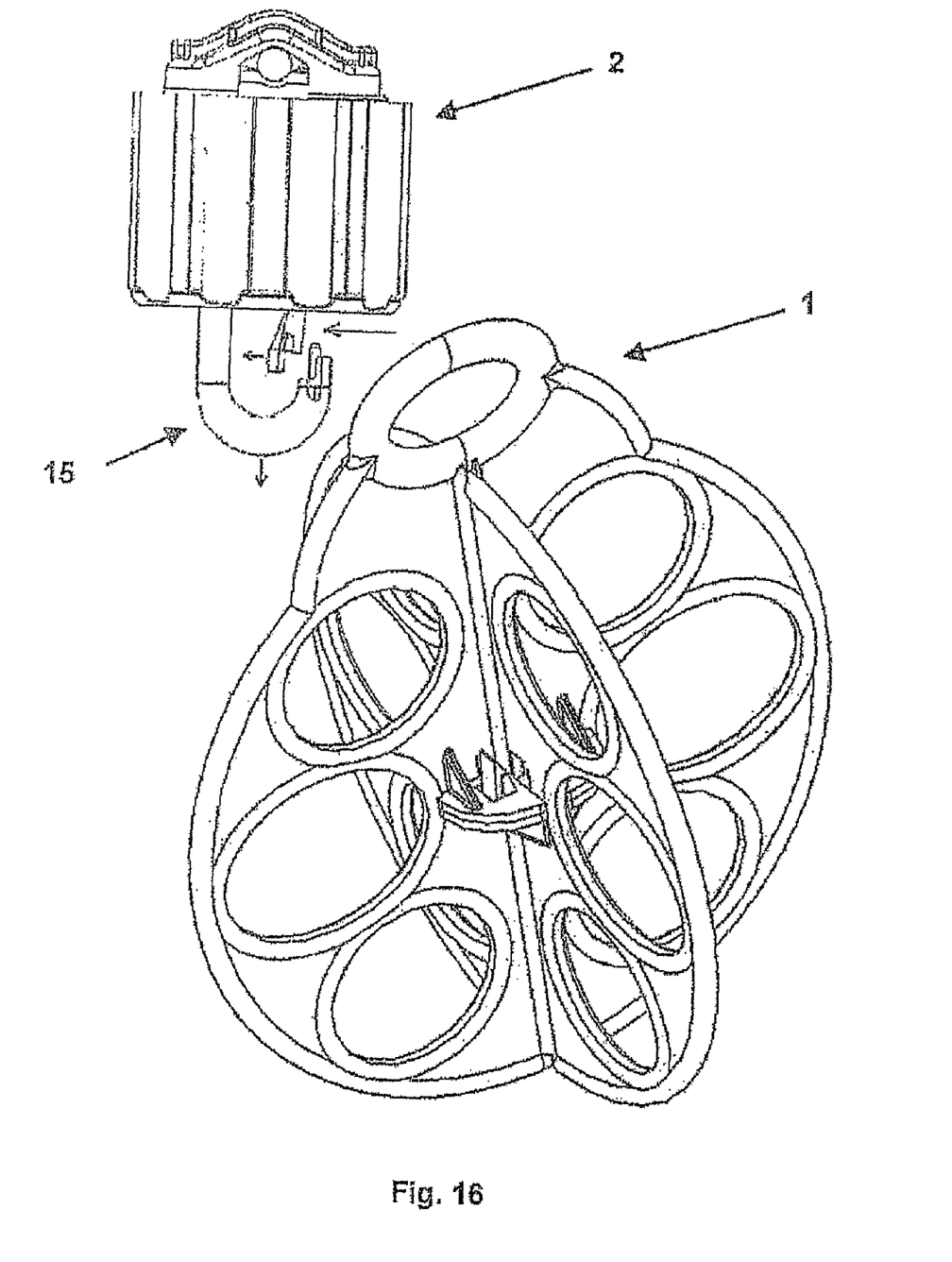
FIG. 16. Shows the fixation system to the overhead cable or wire with the hook open for allowing the assembly with the central body.

Once the fixation system (2) is assembled to the overhead cable or wire (3), the lower part of the first element (15) is opened as shown in FIG. 16 and the deviator central body (1) is inserted. Then, the first element (15) is closed with the flight deviator device assembled to the overhead cable or wire, such as shown in FIG. 1.

In addition to the advantages above mentioned, the fixation system and the flight deviator central body disassembled, occupy less space facilitating its transportation. It is also worth noting that these deviators may be assembled by only one person in overhead cables or wires, in the ground, before its installation or with the overhead cable or wire already installed.

On the other hand, due to its modularity, these deviators are easy to disassemble and its components are easy to be replaced, if it is necessary.

/1/ De la Zerda, Susana. Color Vision in birds. Literature revision. October 2004.

The invention claimed is:

1. A device for deviating the bird's flight for preventing the collision against overhead cables or wires by visual highlight, wherein it is totally manufactured in polymeric material and comprises:
    a central body; and
    a fixation system to overhead cables or wires having different diameters comprised by three elements assembled between each other by thread or pressure wedge:
        a first element with easy to open and to close hook shape;
        a second element showing an external thread and a U-shaped longitudinal slot, allowing the mounting on cables or wires with different diameter; and
        a third element having an internal thread for assembling with the second element, and equipped in its external part with longitudinal grooves for facilitating the grip during the assembly or disassembly and further facilitating bonding with the first element.

2. The device of claim 1 wherein the upper part of the second element and the upper part of the first element of the fixation system, both have a V-shaped channel section which at the time of the assembly between each other, allow the adjusted and secure grip of the overhead cables or wires with different diameter.

3. The device according to claim 1, wherein the first element of the fixation system is longitudinally displaced within the second element, by the action of the thread of the third element on the second element for allowing the assembly or disassembly of the fixation system.

4. The device according to claim 1, wherein the closing of the first element of the fixation system is comprised by a protuberance and a cavity which holds it for preventing the easy opening of the hook in the maximum operation load levels.

5. The device according to claim 1, wherein the third element of the fixation system comprises perforations in its lower part for preventing it to get dirty.

6. The device according to claim 1, wherein by comprising the fixation system to overhead cables or wires having different diameter and the central body consisting of two or more components showing a guide and a longitudinal slot disposed in such a way that they allow the crossed assembly by slipping of the components between each other, the body assembled occupying a volume larger that the volume of the components independently.

7. The device of claim 6 wherein the two components of the central body have different color for generating color contrast with the landscape and vegetation at different hours of the day in the area where the cables or wires are located.

8. The device of claim 7 wherein the two components of the central body have holes for reducing the wind resistance and the significant vibrations in the overhead cables or wires.

* * * * *